(12) United States Patent
Pennello, Jr. et al.

(10) Patent No.: US 8,177,641 B2
(45) Date of Patent: May 15, 2012

(54) SYSTEMS AND METHODS FOR QUICKLY SELECTING VIDEO GAMES

(75) Inventors: Albert J. Pennello, Jr., Kirkland, WA (US); Edward C. Giaimo, III, Bellevue, WA (US); Hugh E. McLoone, Jr., Bellevue, WA (US); James Damon Trim, Sammamish, WA (US); Manuel U. Bronstein, Redmond, WA (US); Richard H. Irving, Kirkland, WA (US); William J. Lauby, Mukilteo, WA (US); Jeffery M. Reents, Carnation, WA (US); William Lawrence, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 414 days.

(21) Appl. No.: 11/407,629

(22) Filed: Apr. 20, 2006

(65) Prior Publication Data

US 2006/0246969 A1    Nov. 2, 2006

Related U.S. Application Data

(63) Continuation-in-part of application No. 11/026,913, filed on Dec. 30, 2004, now Pat. No. 7,670,227.

(51) Int. Cl.
*A63F 13/00*    (2006.01)

(52) U.S. Cl. ............................... 463/37; 463/42; 341/22

(58) Field of Classification Search .................... 463/29, 463/37, 42; 341/22; 361/679.3; 345/168
See application file for complete search history.

(56) References Cited

U.S. PATENT DOCUMENTS

| | | | | |
|---|---|---|---|---|
| 6,574,098 B2 * | 6/2003 | Netzel et al. | ............... | 361/679.3 |
| 6,711,474 B1 * | 3/2004 | Treyz et al. | ........................ | 701/1 |
| 6,747,578 B1 * | 6/2004 | Lam et al. | ........................ | 341/22 |
| 6,761,637 B2 | 7/2004 | Weston et al. | .................. | 463/42 |
| 6,955,606 B2 | 10/2005 | Taho et al. | ........................ | 463/43 |
| 6,967,566 B2 | 11/2005 | Weston et al. | ............. | 340/323 R |
| 7,091,953 B1 * | 8/2006 | Kramer | ......................... | 345/168 |
| 7,315,260 B1 * | 1/2008 | Lam et al. | ........................ | 341/22 |

(Continued)

FOREIGN PATENT DOCUMENTS

JP    63-231762    9/1988

(Continued)

OTHER PUBLICATIONS

Joyner, L.A., et al., "Accounting for user needs and motivations in game design," http://www.inter-disciplinary.net/ci/mm/mm1/Lucy%20Joyner%20paper.pdf, 1-13, downloaded from the Internet on Feb. 27, 2006.

(Continued)

*Primary Examiner* — Masud Ahmed
(74) *Attorney, Agent, or Firm* — Woodcock Washburn LLP

(57) ABSTRACT

A video game controller is equipped with an electronic input that can read a game identification code from an electronic key. When the user presents the key to the game controller, it relays the game ID to the game console. This electronic key may be read via RFID from a detachable faceplate for the controller. The game console utilizes the game ID to quickly find and launch the game from game storage. The game console itself may also be equipped with such an electronic input. The game storage can be built into the console, or on a server accessed through a home network or through the internet. Such use of an electronic key and detachable faceplate is extended to rapid and easy personalization, customization, and function enhancement of entertainment and other consumer electronics devices as well.

15 Claims, 13 Drawing Sheets

U.S. PATENT DOCUMENTS

| | | | |
|---|---|---|---|
| 2003/0011973 A1 | 1/2003 | Jeong | |
| 2003/0036425 A1 | 2/2003 | Kaminkow et al. | 463/25 |
| 2003/0053288 A1* | 3/2003 | Netzel et al. | 361/683 |
| 2004/0214642 A1 | 10/2004 | Beck | 463/40 |
| 2004/0235566 A1* | 11/2004 | Hussaini et al. | 463/37 |
| 2005/0116020 A1 | 6/2005 | Smolucha et al. | 235/375 |
| 2005/0221896 A1 | 10/2005 | Lum et al. | 463/42 |
| 2005/0255916 A1* | 11/2005 | Chen | 463/37 |
| 2006/0018742 A1 | 1/2006 | Hook | 414/502 |

FOREIGN PATENT DOCUMENTS

WO    WO2005/035086 A1    4/2005

OTHER PUBLICATIONS

LaPointe, D., et al., "Analyzing and simulating network game traffic," *Worcester Polytechnic Institute*, 2001, 1-106, downloaded from the Internet Feb. 27, 2006.

\* cited by examiner

SYSTEMS AND METHODS FOR QUICKLY SELECTING VIDEO GAMES

CROSS REFERENCE TO RELATED APPLICATIONS

This application is a continuation-in-part of U.S. patent application Ser. No. 11/026,913, "Changeable Console Faceplate" filed Dec. 30, 2004, the entirety of which is hereby incorporated by reference.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2006, Microsoft Corp.

BACKGROUND

Changing games on a video gaming console typically requires finding a game media disc, inserting it into the media drive, waiting for data to be read, and finally starting the game. This is a slow and cumbersome way to change games. Alternative ways to change games include methods wherein games are stored on a hard disk, eliminating finding and inserting the media, but nevertheless still require finding the game on the hard disk.

These game selection methods have been used for large complex games, and generally are not an impediment to game play since game sessions on complex games frequently last many hours. For simple games that have short game play lasting less than 10 minutes, a quick game selection method shorter than 15 seconds is highly desirable.

Video game systems and other entertainment devices such as media players and even cell phones are designed and developed with specific functionality and are then sold to consumers. While the functionality can sometimes be enhanced via on-line or PC download of system software or game content or skins, consumers frequently never draw upon this resource because they do not have on-line access, the process is too complicated, or they are unaware that enhancements are available. This problem also reveals the more general need for rapid and easy personalization, customization, and function enhancement of entertainment and other consumer electronics devices.

Thus, needed are processes and a system that addresses the shortcomings of the prior art.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, systems and methods for selecting video games and changing the functionality of a consumer product is provided. For several embodiments, a method for selecting a software application to launch comprises detecting when a device associated with a particular software application is attached onto a system for running the software, wherein the software application is not stored on the device. Then it is detected from the device attached, which software application to launch on the system. The software application detected from the device is then found and launched. The software application may, for example comprise a video game and the device may be that which attaches to a video game controller, such as, for example a detachable faceplate.

The detecting which video game to launch comprises, for example, reading via the video game controller, identification data from the device that attaches to the video game controller. The identification data is then communicated from the controller to a video game console for determining which game to launch.

Other advantages and features of the invention are described below.

BRIEF DESCRIPTION OF THE DRAWINGS

Systems and methods for quickly selecting video games is further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Exemplary Multimedia Console

Figure 1:
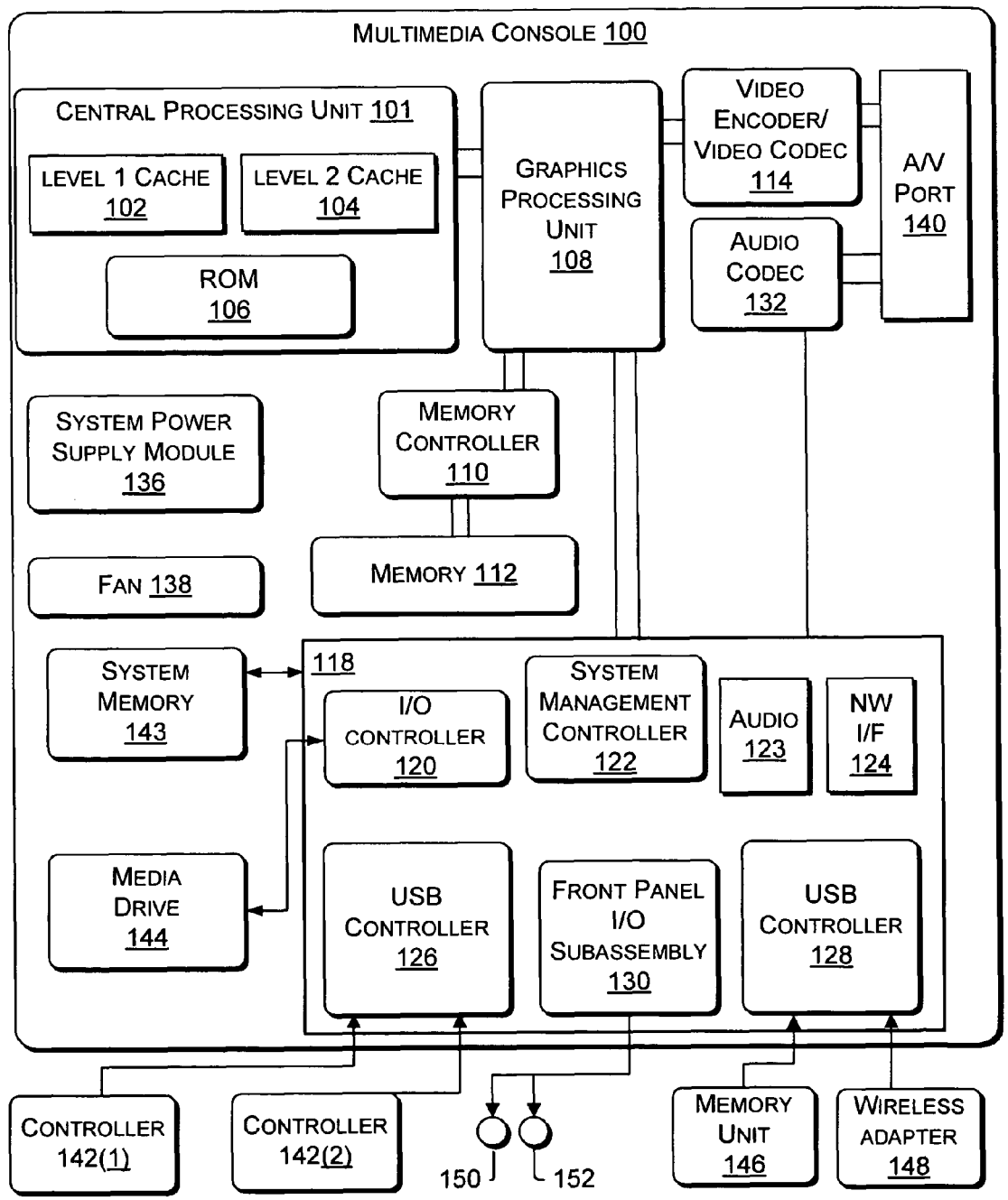
FIG. 1 is a block diagram showing an exemplary multimedia console, in which many computerized processes, including those of various aspects of the invention, may be implemented.

Referring to FIG. 1, shown is a block diagram showing an exemplary multimedia console, in which many computerized processes, including those of various aspects of the invention, may be implemented. For example, the systems and processes of FIG. 2 through FIG. 7 for selecting games may be implemented using or in conjunction with the multimedia console 100 of FIG. 1. The multimedia console 100 has a central processing unit (CPU) 101 having a level 1 (L1) cache 102, a level 2 (L2) cache 104, and a flash ROM (Read-only Memory) 106. The level 1 cache 102 and level 2 cache 104 temporarily store data and hence reduce the number of memory access cycles, thereby improving processing speed and throughput. The flash ROM 106 may store executable code that is loaded during an initial phase of a boot process when the multimedia console 100 is powered. Alternatively, the executable code that is loaded during the initial boot phase may be stored in a FLASH memory device (not shown). Further, ROM 106 may be located separate from CPU 101.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 and CPU 101 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory unit 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless interface components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity, 3D, surround, and stereo audio processing according to aspects of the present invention described above. Audio data is carried between the audio processing unit 123 and the audio codec 126 via a communication link. The audio processing pipeline outputs data to the A/V port 140 for reproduction by an external audio player or device having audio capabilities.

The front panel I/O subassembly 130 supports the functionality of the power button 150 and the eject button 152, communication with external devices, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on or rebooted, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 may allow one or more users to interact with the system, watch movies, listen to music, and the like. However, with the integration of broadband connectivity made available through the network interface 124 or the wireless adapter 148, the multimedia console 100 may further be operated as a participant in a larger network community.

Figure 2:
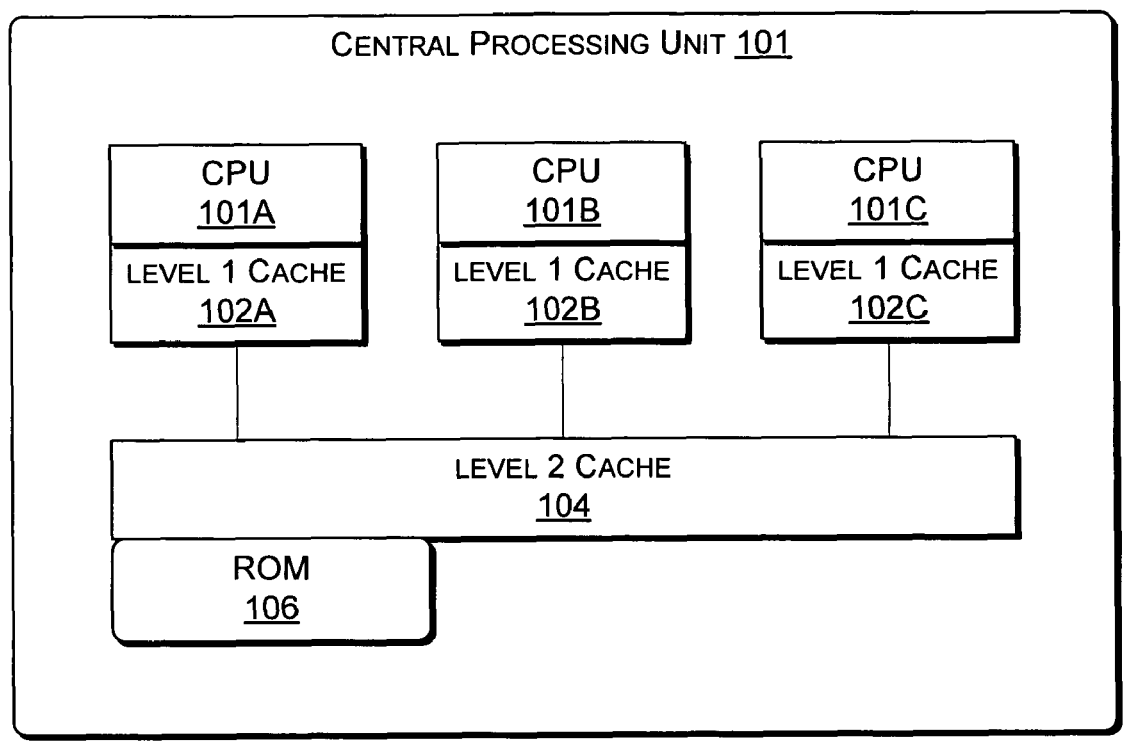
FIG. 2 is a block diagram showing further details of the exemplary multimedia console of FIG. 1, in which many computerized processes, including those of various aspects of the invention, may be implemented.

Referring next to FIG. 2, shown are further details of the exemplary multimedia console of FIG. 1. As shown in FIG. 2, CPU 101 comprises three CPUs: CPU 101A, CPU 101B, and CPU 101C. As shown, each CPU has a corresponding L1 cache 102 (e.g., L1 cache 102A, 102B, and 102C, respectively). As shown, each CPU 101A-C is in communication with L2 cache 104. As such, the individual CPUs 101A, B, and C share L2 cache 104. Because L2 cache 104 is shared between multiple CPU's, it may be complex to implement a technique for reserving a portion of the L2 cache for system applications. While three CPUs are illustrated, there could be any number of CPUs.

The multimedia console depicted in FIG. 1 and FIG. 2 is a typical multimedia console that may be used to execute a multimedia application, such as, for example, a game. Multimedia applications may be enhanced with system features including for example, system settings, voice chat, networked gaming, the capability of interacting with other users over a network, e-mail, a browser application, etc. Such system features enable improved functionality for multimedia console 100, such as, for example, players in different locations can play a common game via the Internet.

Further Exemplary Computing Environments

Figure 3:
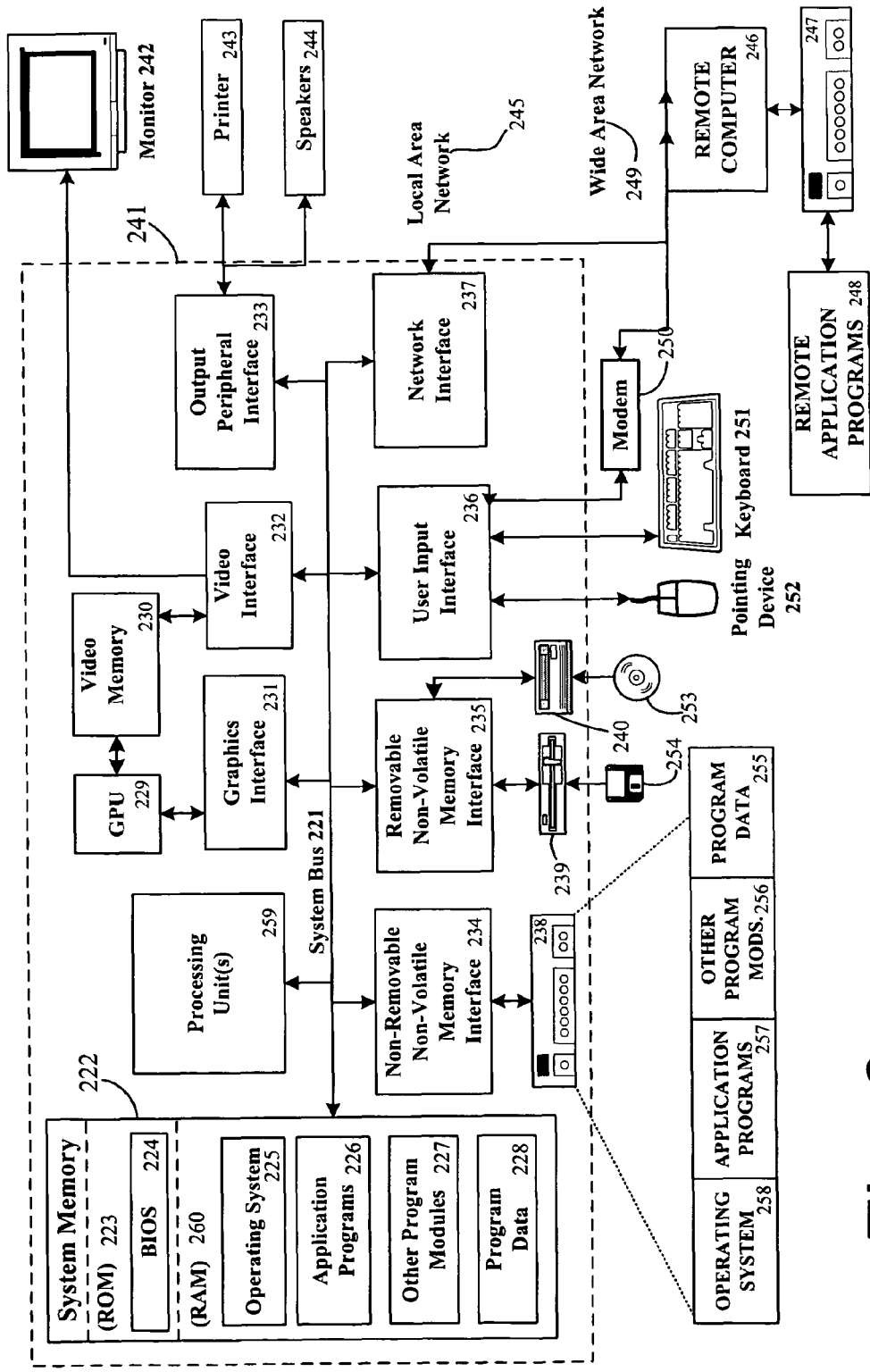
FIG. 3 is a block diagram representing an exemplary computing device in which many computerized processes, including those of various aspects of the invention, may be implemented.

Although the systems and methods for selecting games described hereon is generally applicable to a multimedia console, the process for selecting games may run, be part of and/or also be used on other computing systems such as the exemplary computing environment below. Referring to FIG. 3, shown is block diagram representing an exemplary computing device suitable for use in conjunction with systems and methods for selecting games. For example, the computer executable instructions that carry out the processes and methods for selecting games may reside and/or be executed in such a computing environment as shown in FIG. 3, or such a computing system may make up part of the system for selecting games if said games are stored or run on such a computing system. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220. For example a computer game console may also include those items such as those described below for use in conjunction with implementing the processes described above.

Aspects of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the invention may be implemented in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An exemplary system for implementing aspects of the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 3 illustrates operating system 225, application programs 226, other program modules 227, and program data 228.

The computer 241 may also include other removable/non-removable, volatile/nonvolatile computer storage media. By way of example only, FIG. 3 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 3, provide storage of computer readable instructions, data structures, program modules and other data for the computer 241. In FIG. 3, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 3. The logical connections depicted in FIG. 3 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 3 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the invention in the context of one or more standalone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 3, the systems and methods provided herein cannot be construed as limited in any way to a particular computing architecture. Instead, the invention should not be limited to any single embodiment, but rather should be construed in breadth and scope in accordance with the appended claims.

Selecting Games

Figure 4:
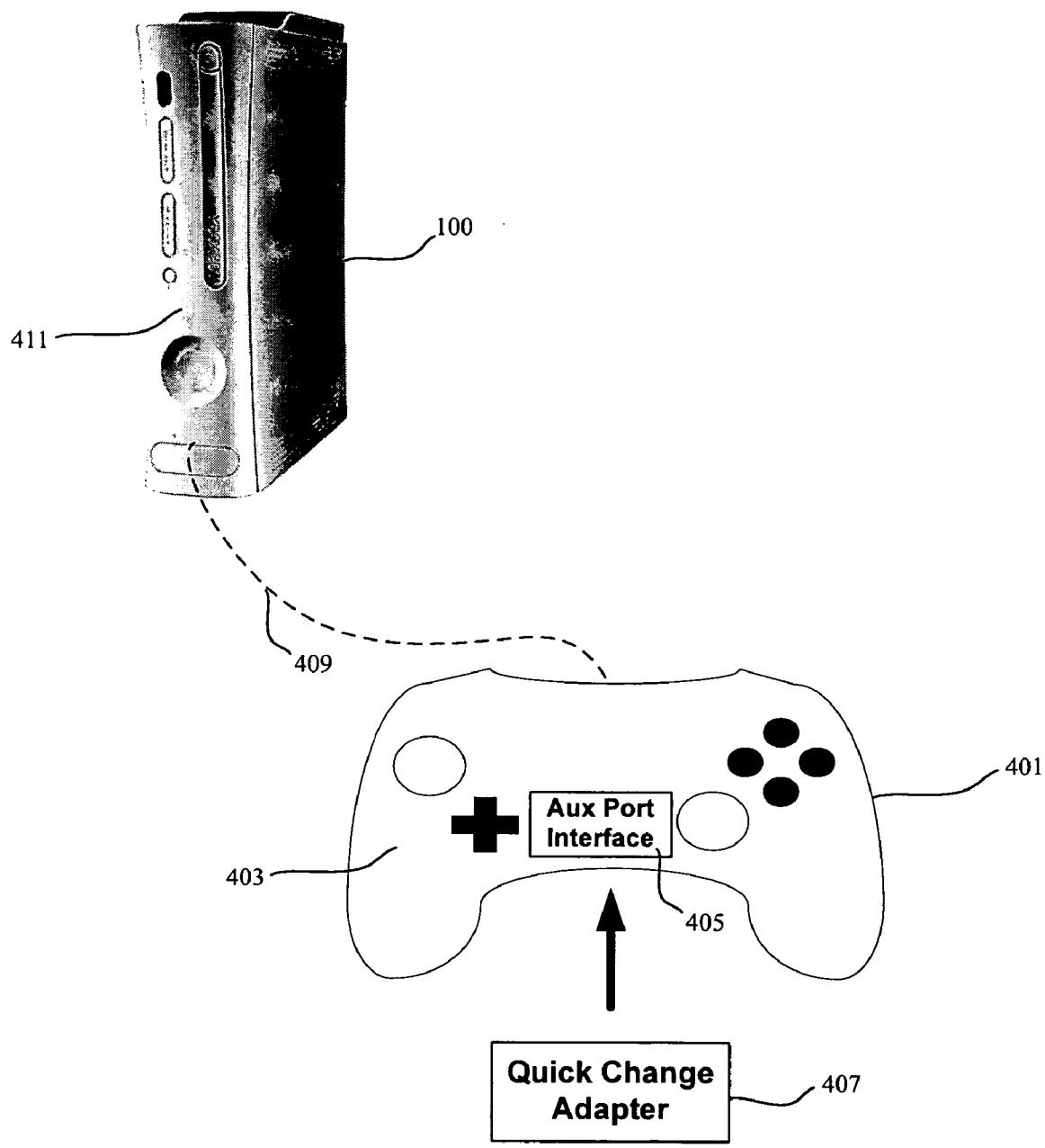
FIG. 4 is a diagram illustrating an exemplary system with a game controller linked to a game console and also having an exemplary quick game change adapter.

Referring next to FIG. 4, shown is a diagram illustrating an exemplary system with a game controller 401 linked to a game console 100 and also having an exemplary quick game change adapter 407. Shown is an example front exterior perspective view of the multimedia game console 100 of FIGS. 1 and 2, a game controller with an electronic faceplate 403 and an auxiliary port interface 405, and a quick game change adapter 407.

The electronic faceplate 403 attaches to the game controller 401, for example, in a similar fashion to how the changeable console faceplate attaches to the game console as described in detail in parent U.S. patent application Ser. No. 11/026,913, filed Dec. 30, 2004, which is hereby incorporated by reference in its entirety. The quick game change adapter 407 plugs into the auxiliary port 405 on the game controller 403. This adapter 407 contains electronic circuitry to "read" the personality of the electronic faceplate 403. This personality of the electronic faceplate 403 includes, for example, an identifier for a particular game associated with that faceplate 403.

One example of how the above reading is accomplished is via wireless radio frequency (RF) technology, such as radio frequency identification (RFID), but can also be by other means, such as contact switches. RFID allows data to be transmitted by a device containing an RFID tag microchip, which is read by an RFID reader. The data transmitted can provide identification or location information about the device, or any other information as may be desirable. No contact or even line-of-sight is needed to read data from a product that contains an RFID tag. RFID tags are tiny microchips with memory and an antenna coil, thinner than paper and some only 0.3 mm across. RFID tags listen for a radio signal sent by a RFID reader. When an RFID tag receives a query, it responds by transmitting its unique ID code and other data back to the reader. There are two types of RFID tags: passive and active.

Passive RFID tags can be as small as 0.3 mm and don't require batteries. Rather, they are powered by the radio signal of a RFID reader, which "wakes them up" to request a reply. Passive RFID tags can be read from a distance of about 20 feet. Semi-passive RFID tags contain a small battery that boosts the range. Passive tags are generally read-only, meaning the data they contain cannot be altered or written over.

Active RFID tags, also called transponders because they contain a transmitter that is always "on", are powered by a battery, about the size of a coin, and are designed for communications up to 100 feet from the RFID reader. They are larger and more expensive than passive RFID tags, but can hold more data about the product and are commonly used for high-value asset tracking. Active RFID tags may be read-write, meaning data they contain can be written over.

RFID readers, also called interrogators, first and foremost are used to query RFID tags in order to obtain identification, location, and other information about the device or product the tag is embedded in. The RF energy from the reader antenna is collected by the RFID tag antenna and used to power up the microchip.

There are two types of RFID readers: RFID read-only readers and RFID read-write readers. As the name suggests, RFID read-only readers can only query or read information from a nearby RFID tag. These readers are found in fixed, stationery applications as well as portable, handheld varieties. Also known as encoders, RFID read-write readers read and also write (change) information in an RFID tag. Such RFID encoders can be used to program information into a "blank" RFID tag.

In the example, provided above, the adapter 407 contains electronic circuitry to "read" the personality of the electronic faceplate 403. This could be for example, an RFID reader as described above contained in the adapter 407. The electronic faceplate 403 then contains the RFID tag as described above, for example. The game controller 401 communicates which faceplate 403 is installed by a user to the game console 100 via a wired or wireless link 409. For example, this is typically the same link used to communicate activation of the game controller 401 user controls. The game console communications protocol may, for example, have data fields that can be used by devices installed into the Aux Port 405.

Figure 5A:
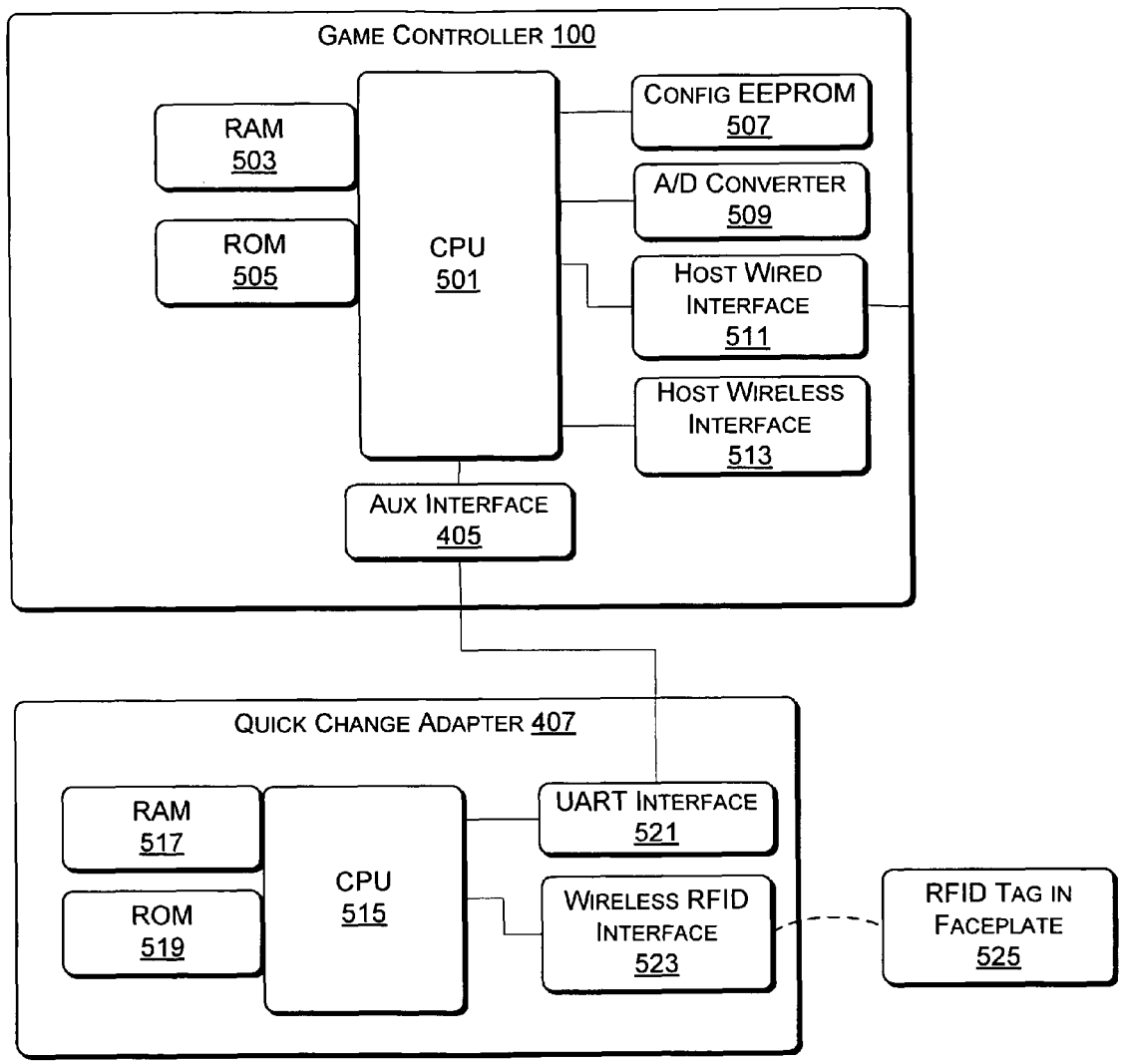
FIG. 5A is a block diagram illustrating the game controller and quick game change adapter of FIG. 4 utilizing radio frequency identification (RFID) for game identification.

Referring next to FIG. 5A, shown is a block diagram illustrating the game controller 401 and quick game change adapter 407 of FIG. 4 utilizing radio frequency identification (RFID) for game identification. Included is a more detailed view of the exemplary game controller 401 and quick game change adapter 407 of FIG. 4. The game controller 401, for example, comprises a central processing unit (CPU) 501 with random access memory (RAM) 503 and read only memory (ROM) 505, the auxiliary interface 405, configuration EEPROM 507, A/D converter 509, host wired interface 511, and host wireless interface 513. The quick game change adapter 407 is in communication with the game controller 402 via the auxiliary interface 405. The quick game change adapter 407 comprises, for example, a central processing unit (CPU) 515 with random access memory (RAM) 519 and read only memory (ROM) 517, a UART interface 521, and a wireless RFID interface 523. The wireless RFID interface 523 is to read an RFID integrated circuit (IC) tag 525 embedded within the game controller faceplate 403. The contents of the RFID tag 525 is communicated to the game controller via the UART/Aux Port 521. The game controller 401, in turn, sends the faceplate ID to the multimedia console 100 via its host wired 511 or wireless 513 interface so that the multimedia console 100 software can launch the correct game or other software application associated with the faceplate 403 provided by the user.

Figure 5B:
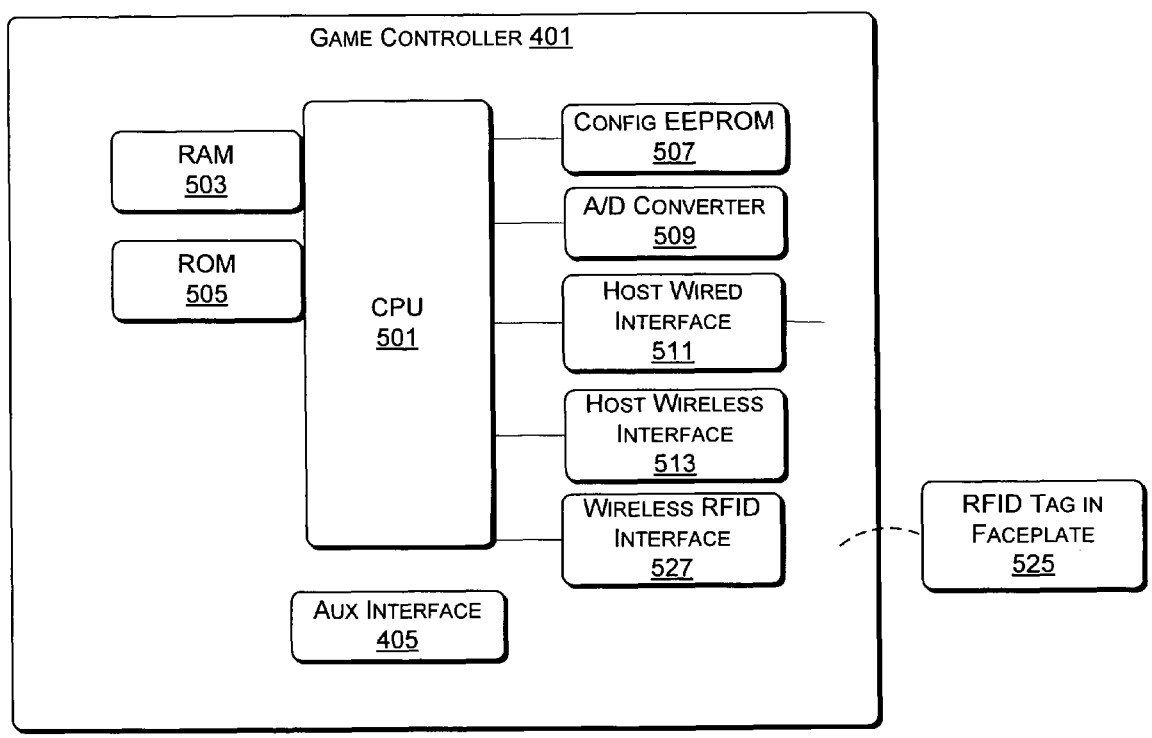
FIG. 5B is a block diagram illustrating the game controller of FIG. 4, wherein the game controller is utilizing RFID.

Referring next to FIG. 5B, shown is a block diagram illustrating the game controller 401 of FIG. 4, wherein the game controller is utilizing RFID. The game controller contains a wireless RFID interface 527 to read the RFID IC tag 525 embedded within the game controller faceplate 403 (see FIG. 4). The game controller sends the faceplate ID to the multimedia console 100 via its host wired 511 or wireless 513 interface so that the multimedia console 100 software can launch the correct game or other software application associated with the faceplate 403 provided by the user.

Figure 5C:
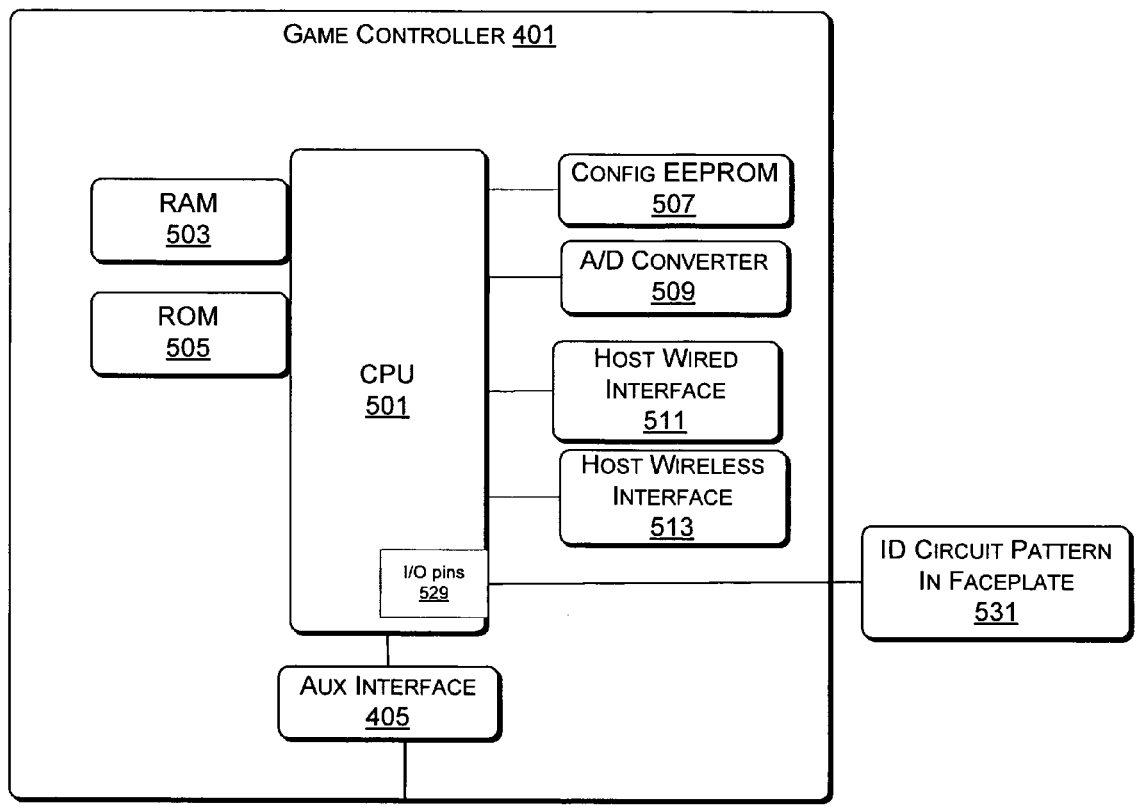
FIG. 5C is a block diagram illustrating the game controller and quick game change adapter of FIG. 4, wherein the game controller is utilizing I/O pins to read identification circuitry.

Referring next to FIG. 5C, shown is a block diagram illustrating the game controller 401 and quick game change adapter 407 of FIG. 4, wherein the game controller is utilizing I/O pins 529 to read identification circuitry. The game controller 401 contains I/O pins 529 to read identification circuitry 531 in the game controller faceplate 403. The game controller 401 sends the faceplate ID to the multimedia console 100 via its host wired 511 or wireless 513 interface so that the multimedia console 100 software can launch the correct game or other software application associated with the faceplate 403 provided by the user.

Figure 6A:
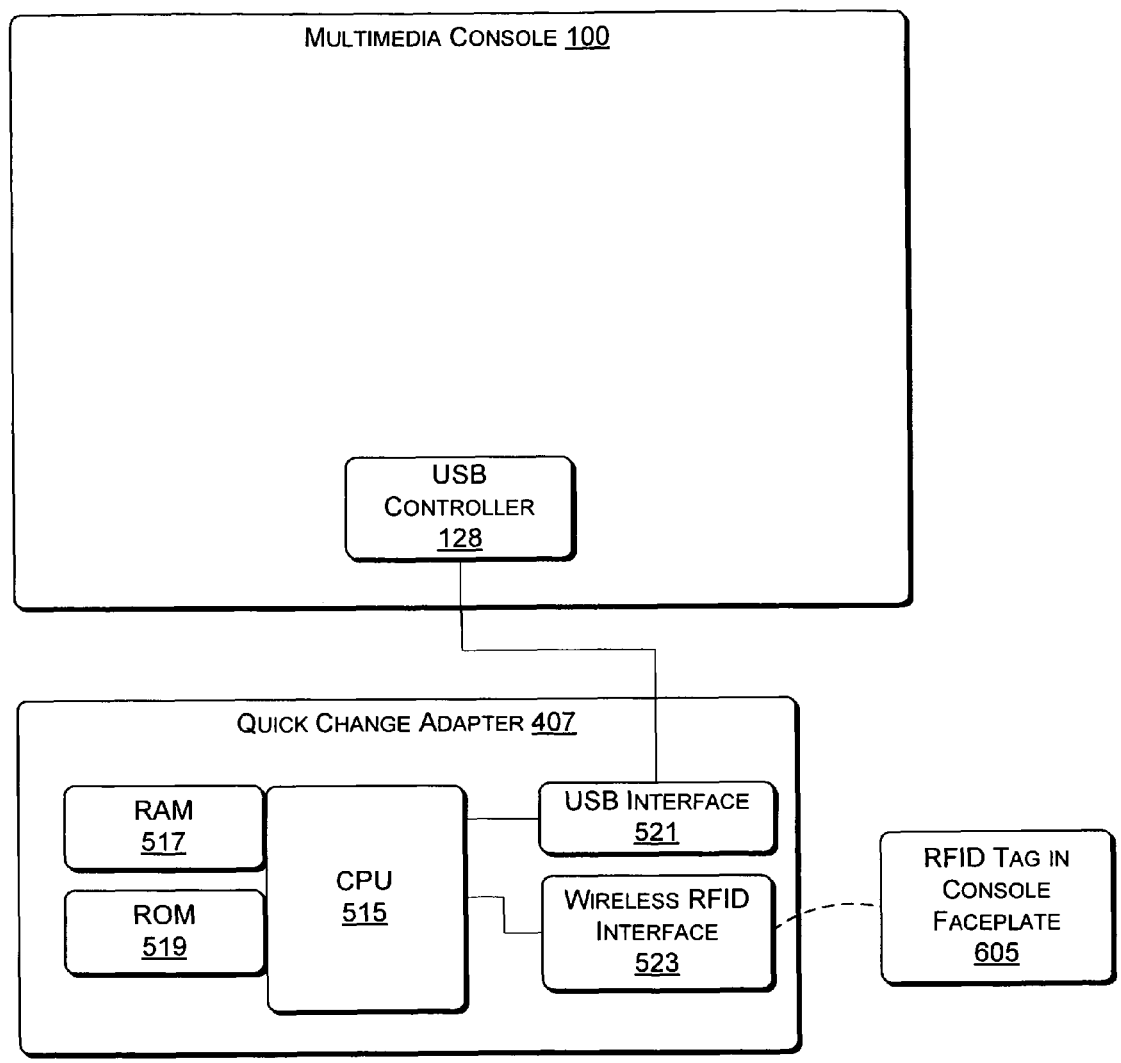
FIG. 6A is a block diagram illustrating the game console and quick game change adapter of FIG. 4 linked directly to the game console, wherein the quick game change adapter is utilizing RFID for game identification.

Referring next to FIG. 6A, shown is a block diagram illustrating the game console 100 and quick game change adapter 407 of FIG. 4 linked directly to the game console 100, wherein the quick game change adapter 407 is utilizing RFID for game identification.

The quick game change adapter 407, for example, contains a wireless RFID interface 523 to read the RFID IC tag 605 embedded within the multimedia console faceplate 411 (shown in FIG. 4). The contents of the RFID tag 605 is communicated from the quick game change adapter 407 to the console 100 via one of the console's universal serial bus (USB) ports 128. The multimedia console 100 software retrieves the RFID information from the quick game change adapter 407 to launch the correct game or other software application associated with the faceplate 403 provided by the user.

Figure 6B:
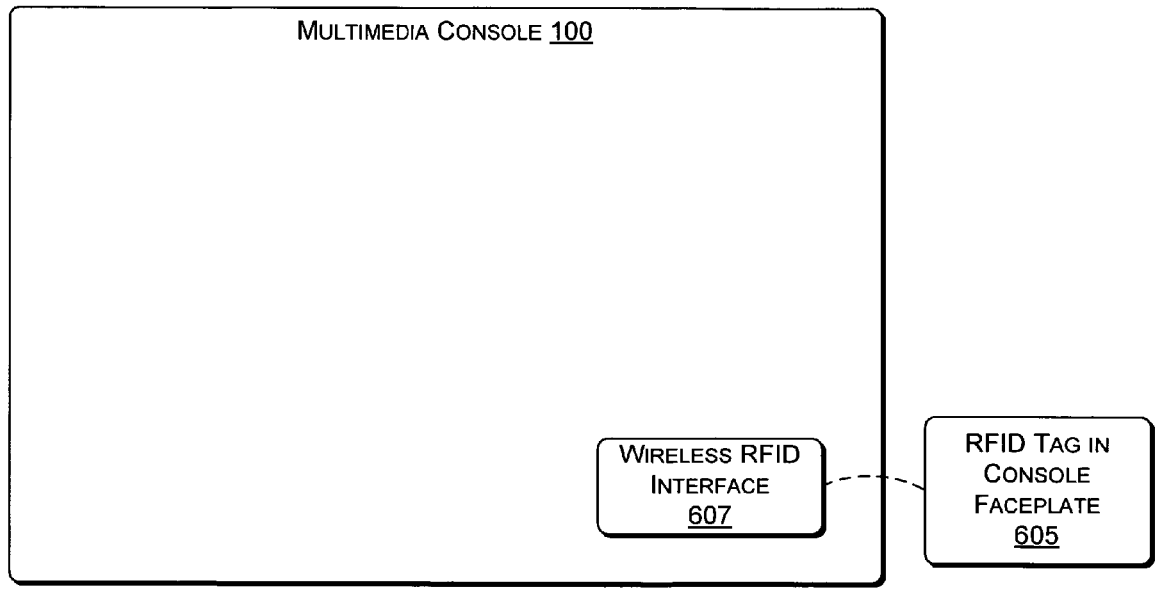
FIG. 6B is a block diagram illustrating the game console of FIG. 4, wherein the game console is utilizing RFID for game identification.

Referring next to FIG. 6B, shown is a block diagram illustrating the game console 100 of FIG. 4, wherein the game console 100 is utilizing RFID for game identification. The multimedia console 100 contains a wireless RFID interface 607 to read the RFID IC tag 605 embedded within the multimedia console faceplate 411 (shown in FIG. 4). The multimedia console 100 software retrieves the RFID information from the RFID interface 607 to launch the correct game or other software application associated with the faceplate 411 provided by the user.

Figure 6C:
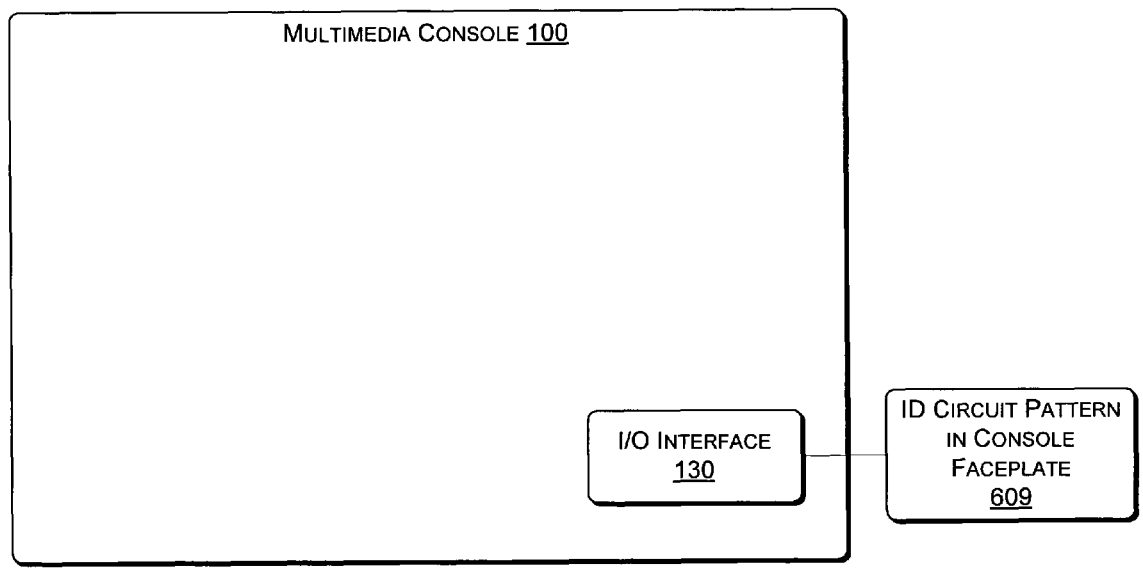
FIG. 6C is a block diagram illustrating the game console of FIG. 4, wherein the game console is utilizing I/O pins for game identification.

Referring next to FIG. 6C, shown is a block diagram illustrating the game console 100 of FIG. 4, wherein the game console 100 is utilizing I/O pins for game identification. The multimedia console 100 contains I/O pins 130 to read identification circuitry 609 embedded within the multimedia console faceplate 411 (shown in FIG. 4). The multimedia console 100 software retrieves the RFID information from the I/O interface 130 to launch the correct game or other software application associated with the faceplate 411 provided by the user.

Figure 7:
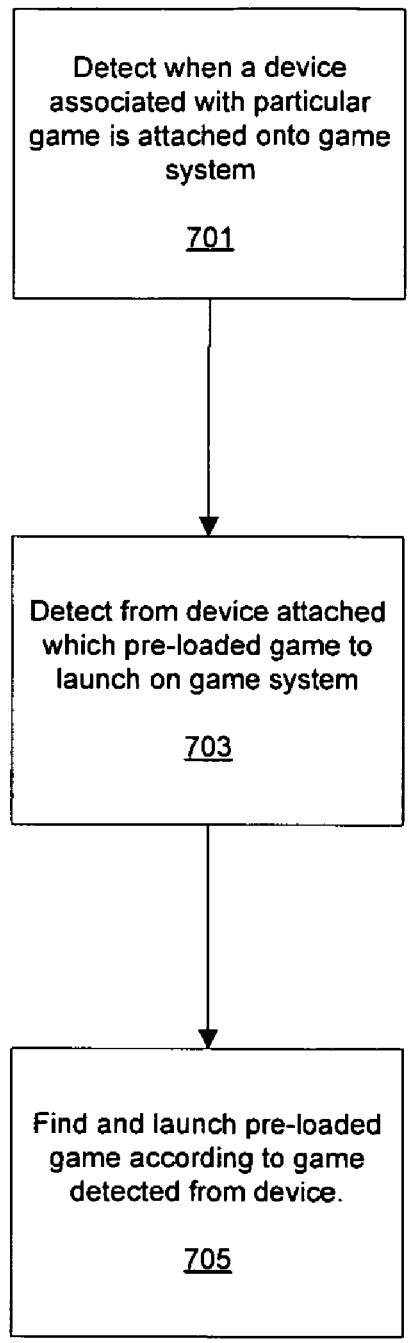
FIG. 7 is a flow chart illustrating an exemplary process of selecting games utilizing the systems of FIGS. 1-6C.

Referring next to FIG. 7, shown is a flow chart illustrating an exemplary process of selecting games utilizing the systems of FIGS. 1-6C. First, the system detects 701 when a device associated with particular game is attached onto the game system. This may include, for example a device being attached to a game controller 401 of a game system, the multimedia console itself 100, or any other peripheral device of the game system. Then, it is detected 703 from the device attached which pre-loaded game to launch on the game system. This may be, for example, via a particular tag or ID (i.e., game ID) stored on or associated with the device that is associated with a particular game. Finally, the game corresponding to the game detected from the device is found and launched on the game system. For example, this may be via the game console 100 utilizing the game ID to quickly find and launch the game from game storage. The game storage can be built into the console 100, or on a server accessed through a home network or through the Internet.

Application to Other Consumer Products

In addition to providing a mechanism to easily select and switch between video games, similar mechanisms enable users of other consumer products to rapidly and easily personalize, customize and enhance the function of their entertainment and other consumer electronics devices. Video game systems and other entertainment devices such as media players and even cell phones are designed and developed with specific functionality and are then sold to consumers. While the functionality can sometimes be enhanced via on-line or PC download of system software or game content or skins, consumers frequently never draw upon this resource because they do not have on-line access, the process is too complicated, or they are unaware that enhancements are available. Example solutions to address this problem are described below.

Figure 8:
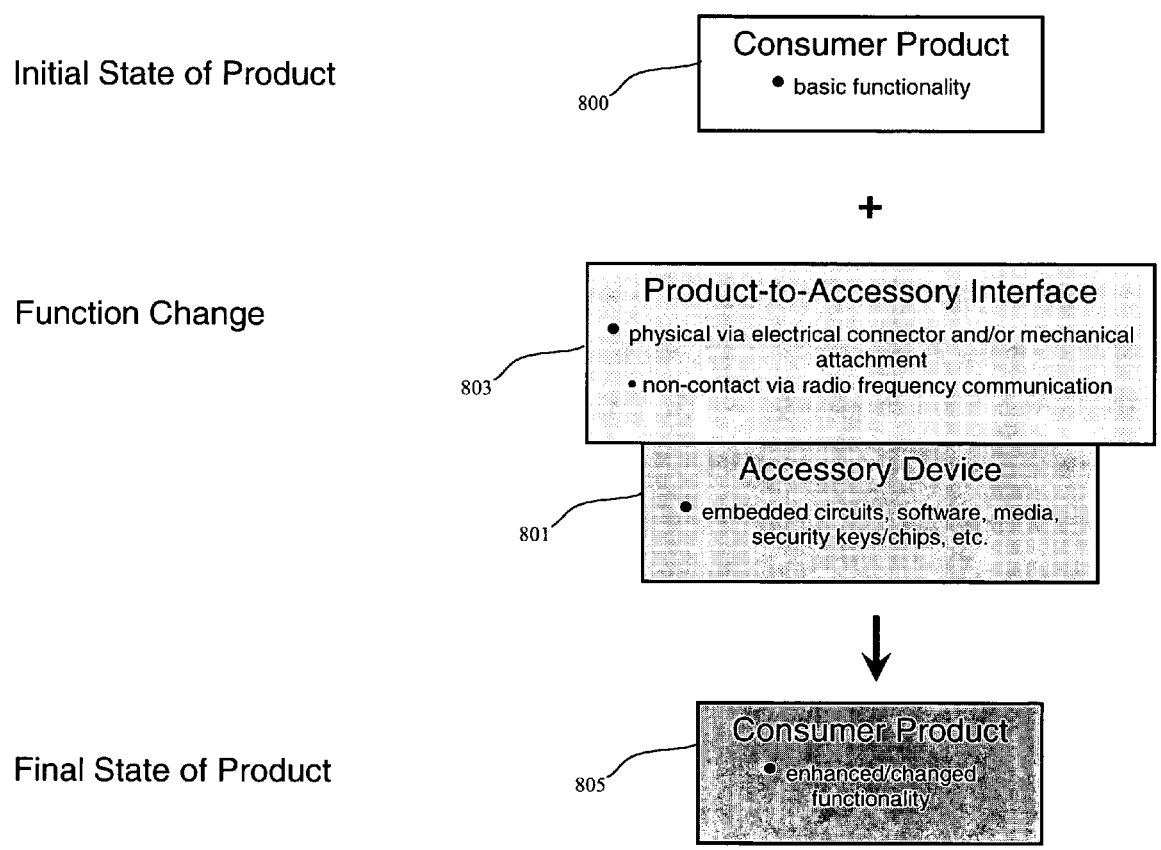
FIG. 8 is a diagram illustrating a process for changing the functionality of a consumer electronics product.

Referring next to FIG. 8, shown is a diagram illustrating a process for changing the functionality of a consumer electronics product. For example, a consumer product such as a game console 100 comes configured with a set of basic functionalities 800. An enhancement release mechanism and/or content is pre-embedded 801 in the game console 100 or device or in the system control device itself or in an on-line account via a service network (e.g., cellular network or Microsoft® Xbox Live® service). A console faceplate 411 or an accessory unit such as a game controller 401 can be advertised and sold at retail such that the consumer is made aware of the enhancement capability and can immediately purchase and enable the enhancement by simply attaching 803 the faceplate 411 or accessory unit to the original device, for example. This may be accomplished via the same mechanisms or similar mechanisms described in U.S. patent application Ser. No. 11/026,913 regarding the console face plate and above regarding the selection of video games using the controller faceplate 403. The final state of the consumer electronics product (e.g., after attaching the faceplate) is that the product has the desired enhanced/changed functionality 805. This solves the awareness issue and the simple act of installing the faceplate or accessory to the console 100 or device enables the functionality enhancement without any other user interaction thereby solving the update process issues for the consumer.

Video game systems and control devices (e.g., gamepads, remote controls, WiFi adapters, and other accessories) can be designed and developed such that functional enhancements are built in when the system is first launched to the consumer, but they are not or can not be activated at initial launch. These enhancements may need to be released at a later date for a number of technical reasons (e.g., waiting for other products to be ready, waiting for regional releases or agency approvals, etc.) or they may be features that could be enabled later as a means of refreshing the product over time. The means for unlocking or releasing these enhancements can be difficult to implement and the awareness of customers that these enhancements are available is difficult to establish. Building on the description provided above regarding changing the functionality of consumer products, an example solution to this problem is that a game system is shipped on day 1 with future enhancements built in, but locked from access by the consumer. When it is time to release the enhancements, consumers can purchase or can be otherwise provided with a faceplate or accessory that when installed automatically unlocks the enhancement(s). Again, this solves the release timing issue and the customer process issues.

Gamers and consumers often like different, personalized means of control or interaction with game system and control devices or with their personal entertainment or communication device. They also like to customize or "theme" their devices according to their own taste or to a desired genre or. game theme and graphics. Providing the ability to give the system and/or control devices a personality often is difficult and time consuming to establish or it may not even be an available option requiring the consumer to purchase an alternative product or they simply are not able to participate. Building on the description provided above regarding changing the functionality of consumer products, an example solution to this problem involves a personal entertainment device designed such that circuitry or another unlocking mechanism is enabled by the further addition of an accessory. Installation of the accessory (such as a faceplate) enables software/firmware features such that the device or system is instantly personalized to the taste of the user. A detailed example might be where a user wants his or her gamepad 401 to remap the control inputs or buttons to match a particular game or portion of a game. Installation of an accessory faceplate 403 that either contains additional circuitry, memory, RF identification information, or other unlocking mechanisms instantly transforms the gamepad 401 personality to reflect the desires of the user. Likewise, this same technique could be used to transform a complex game controller 401 into a very basic and easy to use controller by transforming the control mapping and response as well as mechanically modifying the controls. The accessory may interact with the mechanics of the gamepad 401, the software/firmware of the gamepad 401, the software/firmware in the game console 100, or the actual game software, or all of these at once or in succession.

Figure 9:
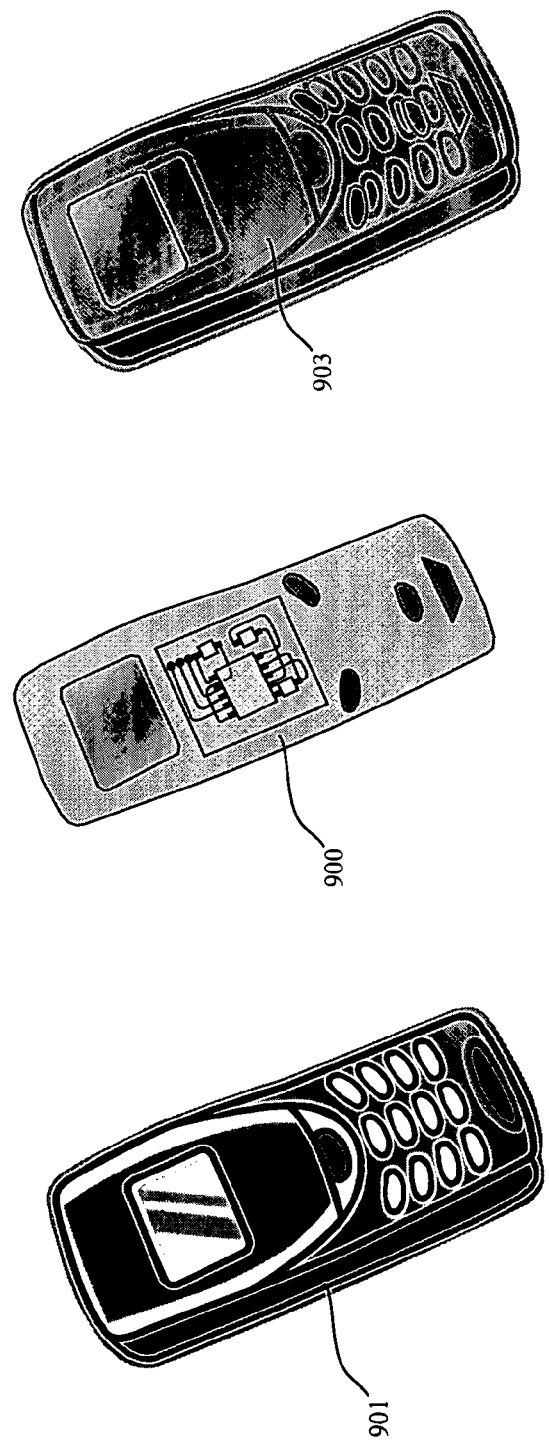
FIG. 9 is a diagram illustrating changing the functionality of a consumer product according to the process of FIG. 8, using a cellular telephone as an example.

Likewise, the technique described above is extended to a cell phone or media player where a user wants to impart his or her phone or device with a personality that enables his or her enhanced interaction with the device. Accordingly, referring next to FIG. 9, shown is a diagram illustrating changing the functionality of a consumer product according to the process of FIG. 8, using a cellular telephone as an example. An accessory 900 similar to that described above, once installed 903 on the phone or device 901, instantly changes functionality. This functionality may be, but is not limited to: font size, language, skin (graphic theme), button mapping, and other attributes as well as downloading of address books, quick messages, icons, music and video. Also a new style or color is imparted to the device 901 via the physical attributes of the faceplate, covering, or adapter 900.

Additionally, the technique described above is used to enhance on-line functionality with on-line gaming services (e.g., Xbox Live®) where the accessory or faceplate is "recognized" by the service as belonging to an individual user and thereby enables new or unique features, such as custom skins and graphics, coordinated skins and graphics with the actual faceplate or accessory 801, and access to special or new games, groups, communities, genres, or media libraries. Purchase and installation of the accessory 801 could provide special game features or function that allows slight advantage in certain game situations such as an additional weapon, special visibility, or bargaining token. The accessory faceplate 801 could also contain memory similar to Xbox® memory modules such that game checkpoints and levels and other stored data or media can be transferred from one console 100, media player device, or control device to another.

One example implementation is to print a special password on the back of a cell phone faceplate 900 sold at retail. The consumer would install the faceplate 900 and enter the password into the network system. Instantly, the new features, functionality, graphic skin, etc. would be released and available for use.

Another example is the customization of a car's performance, instrumentation panel or media system, or all of these and other attributes at once, or in succession by attachment of a steering wheel "faceplate," as described above with respect to other faceplates, that contains an embedded secure RFID device that must be authenticated by the vehicle's on-board computer system.

Security control is often needed to protect intellectual property and/or personal information. Manufacturers of game systems and entertainment devices that contain proprietary software could benefit from a mechanism that limits the use of the device to users with appropriate licenses thereby preventing tampering and piracy. Likewise, users desire to protect their personal information that may be entered into and contained by an entertainment or communication device such that others cannot access this information. An accessory device containing circuitry, a key, or keys to release the use of the device to the holder of the key(s) can help solve this problem.

For example, a game console 100 contains proprietary circuit designs and software. The console 100 is sold with an authorized accessory such as, for example, a faceplate 411 that contains circuitry or security coding such as a radio frequency identification (RFID) tag. The console 100, has interfacing circuitry 527, 803 that can read and authenticate the accessory ID such that it operates normally when this authorized accessory is used. If the authorized accessory 411 is removed or altered, the function of the console 100 is stopped or changed, thereby protecting the circuit designs and software and indicating that the unit has been tampered with or used with an unauthorized accessory.

In the example of a cell phone 901 or other device that may contain personal information, the normal operation and access to the information would be enabled by the authorized accessory or faceplate 900. Removal of the authorized faceplate 900 or installation of a non-authorized faceplate or accessory would change the function of the device 901 and/or prevent access to any personal information.

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly.

What is claimed:

1. A method for operating a computing device, comprising:
   detecting that a detachable faceplate associated with a user is attached to the computing device, the computing device having stored thereon a plurality of software applications, and the detachable faceplate comprising authorization information, an identification of a target software application, and information about the user;
   authenticating the detachable faceplate based on the authorization information;
   determining, based on the identification, that the target software application is one of the plurality of software applications stored on the computing device;
   determining user preferences based on the information about the user; and
   enabling the user preferences on the computing device and launching the target software application.

2. The method of claim 1 wherein the user preferences are associated with a video game.

3. The method of claim 2 wherein the computing device comprises a video game controller and the detachable faceplate is attachable to the video game controller.

4. The method of claim 3 wherein the determining user preferences comprises:
   reading, via the video game controller, identification data from the detachable faceplate; and
   communicating the identification data from the video game controller to a video game console for said enabling the user preferences.

5. The method of claim 4 wherein the reading is accomplished using radio frequency identification (RFID) communication between the video game controller and the detachable faceplate.

6. An adapter device for a video game controller comprising:
   electronic circuitry configured to read data from a detachable faceplate that attaches to the video game controller, the detachable faceplate being associated with an online gaming service, the data comprising recognition of a user and an identification of the online gaming service;

wherein the electronic circuitry is further configured to access at least one function of the online gaming service based on the recognition of the user and the identification of the online gaming service; and an interface configured to communicate the data to the video game controller through an auxiliary port on the video game controller.

7. The adapter of claim 6 wherein the electronic circuitry to read data from the detachable faceplate that attaches to the video game controller comprises an RFID reader, and the detachable faceplate comprises an RFID.

8. The adapter of claim 6 wherein the electronic circuitry to read data from the detachable faceplate that attaches to the video game controller comprises contact switches through which data is read from the detachable faceplate.

9. A system for modifying functionality of a computing device comprising:

means for detecting that a detachable faceplate associated with a user is attached to the computing device, the computing device having stored thereon a plurality of software applications, and the detachable faceplate comprising an an identification of a target software application and information about the user;

means for determining, based on the identification, that the target software application is one of the plurality of software applications stored on the computing device;

means for determining user preferences based on the information about the user; and means for enabling the user preferences on the computing device and launching the target software application.

10. The system of claim 9 wherein the user preferences are associated with a video game.

11. The system of claim 10 wherein the detachable faceplate attaches to a video game controller of the computing device.

12. The system of claim 11 wherein the means for determining user preferences comprises:

means for reading, via the video game controller, identification data from the detachable faceplate; and means for communicating the identification data from the controller to a video game console for determining the user preferences.

13. The system of claim 12 wherein the means for reading comprises means for radio frequency identification (RFID) communication between the controller and the detachable faceplate.

14. A video game controller system comprising:

a video game controller having a housing;

a detachable auxiliary device comprising an electronic key, the key having identification data stored thereon, the identification data comprising information about a user and information about an online gaming service;

an interface enabling electronic communication between the electronic key and the video game controller, the interface configured to ascertain the identification data;

means for communicating from the video game controller to a video game console the identification data stored on the electronic key;

means for determining the online gaming service from the identification data and communicating the information about the user to the online gaming service; and means for accessing at least one function of the online gaming service based on the identification data.

15. The system of claim 14 wherein the detachable auxiliary device is a faceplate for the video game controller and the communication between the electronic key and the video game controller is via RFID.

\* \* \* \* \*